(12) United States Patent
Grayson et al.

(10) Patent No.: US 8,023,503 B2
(45) Date of Patent: Sep. 20, 2011

(54) MULTI-HOMING BASED MOBILE INTERNET

(75) Inventors: Mark Grayson, Berkshire (GB); Jayaraman R. Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 702 days.

(21) Appl. No.: 12/166,932

(22) Filed: Jul. 2, 2008

(65) Prior Publication Data

US 2010/0002660 A1 Jan. 7, 2010

(51) Int. Cl.
*H04L 12/28* (2006.01)

(52) U.S. Cl. .......................... 370/389; 370/392

(58) Field of Classification Search .................. 370/389, 370/310.2, 328, 338, 368, 371, 392, 381, 370/399, 395.31, 401, 402
See application file for complete search history.

(56) References Cited

U.S. PATENT DOCUMENTS

| | | | |
|---|---|---|---|
| 6,741,853 B1 * | 5/2004 | Jiang et al. | 455/418 |
| 7,287,271 B1 * | 10/2007 | Riggins | 726/3 |
| 2009/0043891 A1 * | 2/2009 | Woo et al. | 709/225 |
| 2009/0132682 A1 * | 5/2009 | Counterman | 709/220 |

* cited by examiner

*Primary Examiner* — Brenda Pham

(74) *Attorney, Agent, or Firm* — Haynes and Boone LLP

(57) ABSTRACT

In one embodiment, a method of providing mobile internet comprises receiving a down-link packet having a endpoint identity protocol element (EIP), the EIP comprising a global locator associated with a provider network, a first local locator set to a predetermined value, and an endpoint identifier associated with a mobile host; querying the provider network to obtain a second local locator value associated with the mobile host, the second local locator indicates the location of a first radio router with which the mobile host had previously exchange authentication; overwriting the first local locator portion of the EIP with the second local locator; and routing the down-link packet towards the mobile host using the second local locator.

13 Claims, 12 Drawing Sheets

| 64 bits | | | 64 bits |
|---|---|---|---|
| Internet Locator | | | Internet Locator |
| 32 bits | 28 bits | 4 bits | 64 bits |
| Global Locator | Local Locator | Identifier Type | Identifier Value | even, either because of business, regulatory or technical reasons. Indeed, 3GPP's latest "flat all-IP" archi-
MULTI-HOMING BASED MOBILE INTERNET

TECHNICAL FIELD

The present disclosure relates generally to mobile Internet and methods for providing mobile Internet.

BACKGROUND

Recent deployments of Wireless Local Area Networking (WLAN) have layered mobility providing tunnels over the top of the Internet Protocol (IP) to deliver ubiquitous wide-area mobility. GPRS Tunneling Protocol (GTP), Mobile IP (MIP), Proxy Mobile IP (PMIP), WiMAX's R6 Protocol (GRE), all provide mobility services by tunneling packets over the Internet. Notably Mobile IPv6 does have an optional optimized routed mode whereby after having originally traversed a tunnel, packets are subsequently routed directly between the mobile node and its correspondent. However, the control of route optimization is under the control of the tunnel endpoint, and it is anticipated that in reality optimal routing will not be enabled, either because of business, regulatory or technical reasons. Indeed, 3GPP's latest "flat all-IP" architecture termed System Architecture Evolution (SAE) defines support for MIPv6, but uses a combination of GTP and PMIP tunneling to ensure that all users' packets are tunneled back to complex Mobile Gateways where additional services may be applied.

With almost 1 billion mobile phones sold in 2006, the industry will soon be faced with the situation that the default technique for accessing the Internet will be via a mobility tunnel. Such tunneled traffic bypasses the increasing number of value added features being embedded into the fabric of the Internet, for example, enhanced security functionality being integrated into the edge of the access network. The tunneling of traffic brings a mindset of large Telco-type deployments with rigorous requirements on service availability as the state of potentially millions of hosts is centralized in the tunnel gateway. Because of these approaches, "mobile Internet" services will continue to be more brittle than those delivered over the native IP network on top of which the mobility tunnels are transported.

DESCRIPTION

Overview

In one embodiment, a method of providing mobile internet comprises receiving a down-link packet having a endpoint identity protocol element (EIP), the EIP comprising a global locator associated with a provider network, a first local locator set to a predetermined value, and an endpoint identifier associated with a mobile host; querying the provider network to obtain a second local locator value associated with the mobile host, the second local locator indicates the location of a first radio router with which the mobile host had previously exchange authentication; overwriting the first local locator portion of the EIP with the second local locator; and routing the down-link packet towards the mobile host using the second local locator.

In another embodiment, exchanging authentication with a mobile host; the method of providing mobile internet comprises associating a first endpoint identity protocol element (EIP) with the mobile host, the first EIP comprising a first global locator associated with a provider network, a first local locator, and an endpoint identifier; transmitting the first EIP; transmitting the global locator and the endpoint identifier of the first to a database; receiving a down-link packet originated from a correspondent node with a second EIP, the second EIP having a second global locator provided by the database, a second local locator provided by the provider network, and the endpoint identifier associated with the mobile host; and transmitting the down-link packet to the mobile host.

In the following description, reference is made to the accompanying drawings which illustrate several embodiments. It is understood that other embodiments may be utilized and mechanical, compositional, structural, electrical, and operational changes may be made without departing from the spirit and scope of the present disclosure. The following detailed description is not to be taken in a limiting sense, and the scope of the embodiment is defined only by the claims of the issued patent.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

DESCRIPTION OF EXAMPLE EMBODIMENTS

A method of providing mobile Internet may use multi-homing techniques which can be leveraged by upper layer protocols to allow a single identity to be multi-homed across a number of access networks operated by a variety of entities.

Figure 1:
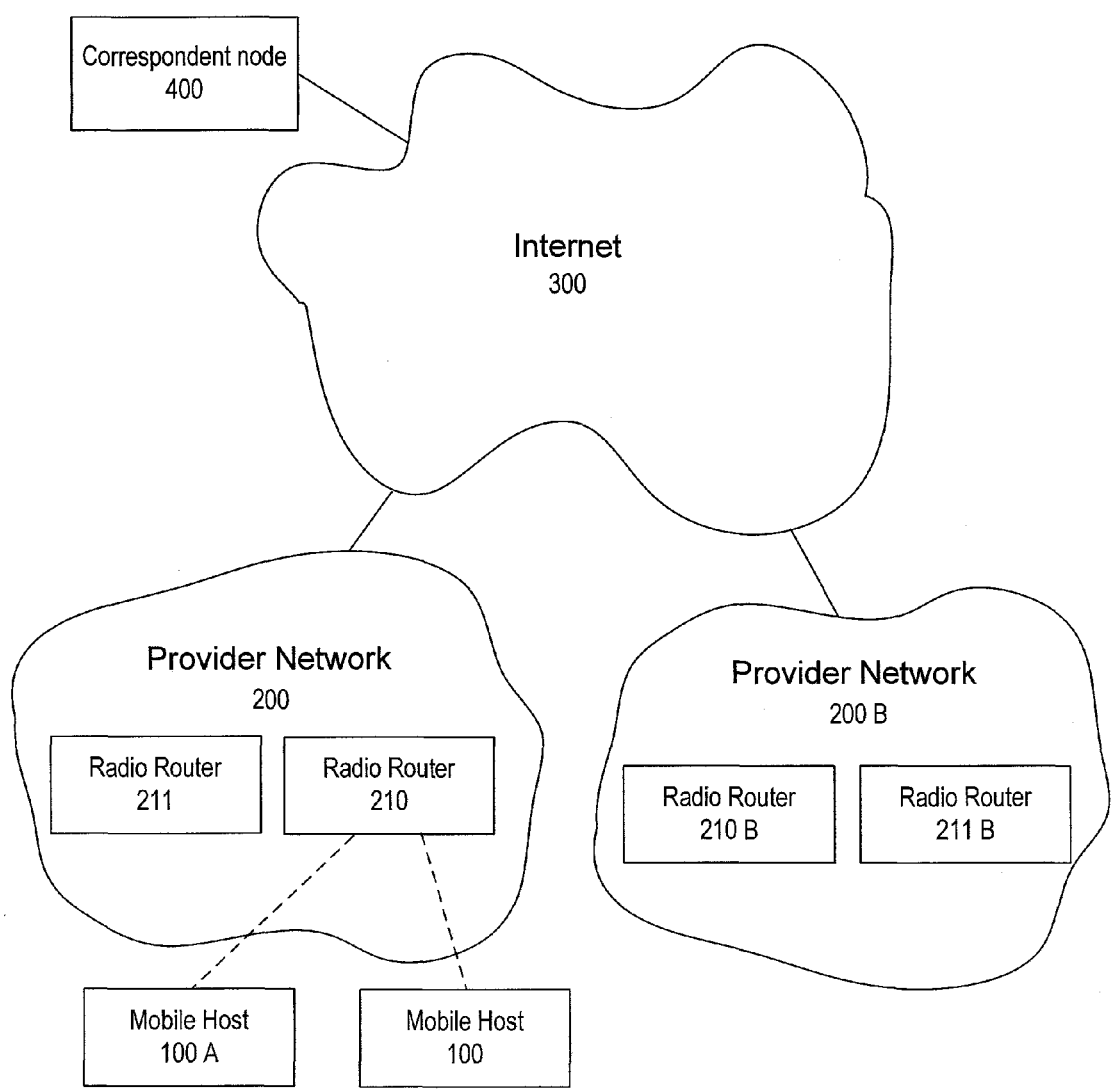
FIG. 1 is a block diagram showing an example multi-homing mobile Internet system, in accordance with one embodiment.

FIG. 1 is a block diagram showing an example of a mobile Internet in one embodiment. The example mobile Internet comprises of a mobile host 100, a provider network 200, a radio router of the provider network 210, an Internet 300, and a correspondent node 400. There may be one or more additional mobile hosts 100A and provider networks 200B. The correspondent node 400 and the provider networks 200 and 200B are connected through the Internet 300. The mobile hosts 100 and 100A may access the Internet through the provider networks 200 and 200A. The mobile host 100 may be a cellular phone, a laptop computer, a PDA, or other wireless communication devices. The detailed operation of the mobile internet is described with reference to FIG. 4 below.

Figures 2, 3:
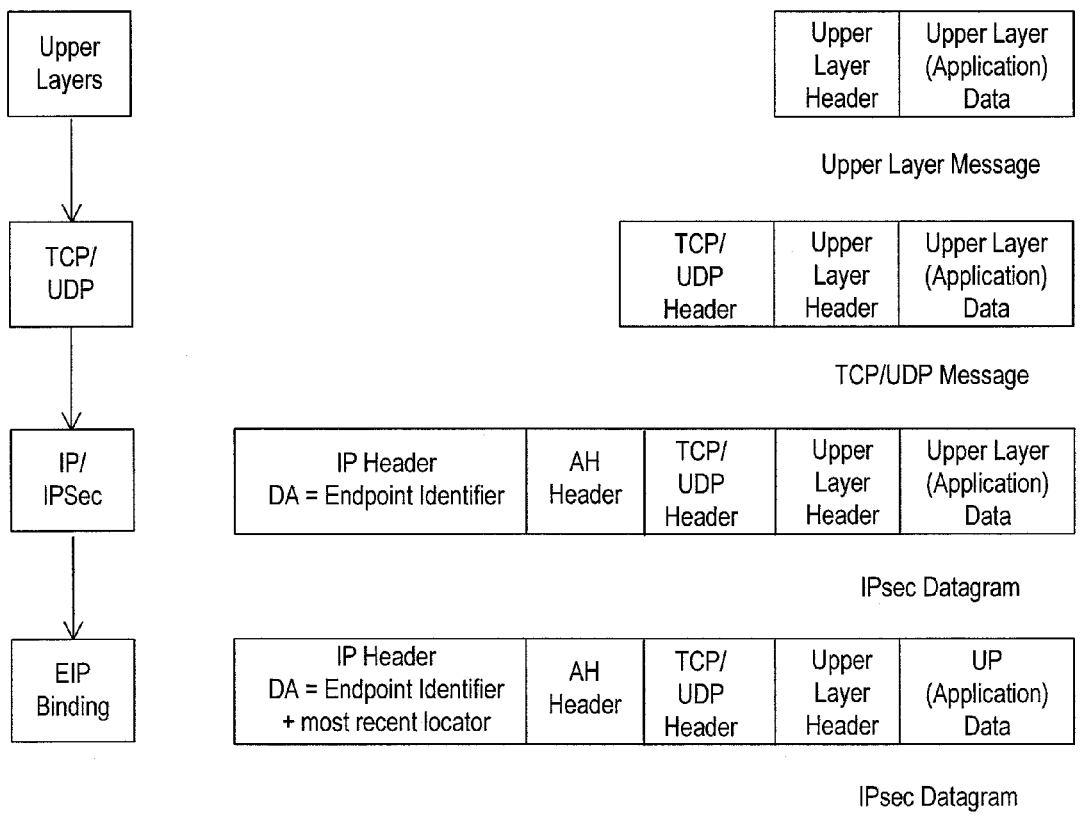
FIG. 2 is a graphic representation of an example extended 64-bit endpoint identifier used in the example multi-homing mobile Internet system, in accordance with one embodiment.
FIG. 3 is a graphic representation of an example Endpoint Identity Protocol Stack (EIP) used in the example multi-homing mobile Internet system, in accordance with one embodiment.

FIG. 2 is a graphic representation of an example endpoint identity protocol stack element utilized by one embodiment. The endpoint identity protocol stack element may consist of a 64-bit Internet locator value and a 64-bit Internet identifier value. The 64-bit Internet locator may further consist of a 32-bit global locator, a 28-bit local locator, and a 4-bit identifier type value. The identifier type value indicates which type of identifier is being used to allow backward and forward compatibility with other types of endpoint identifiers. The functions of the global and local locator will be described below with reference to various procedures utilized by the embodiments.

FIG. 3 is a graphic representation of an example Endpoint Identity Protocol Stack (EIP) utilized by one embodiment. The EIP stack may consist of an upper layer (application) data, an upper layer header, a TCP/UDP header, a AH header, and an IP header. TCP and IPSec checksums may both be applied to the EIP stack before the locator values are added to the IP header of the stack.

Figure 4:
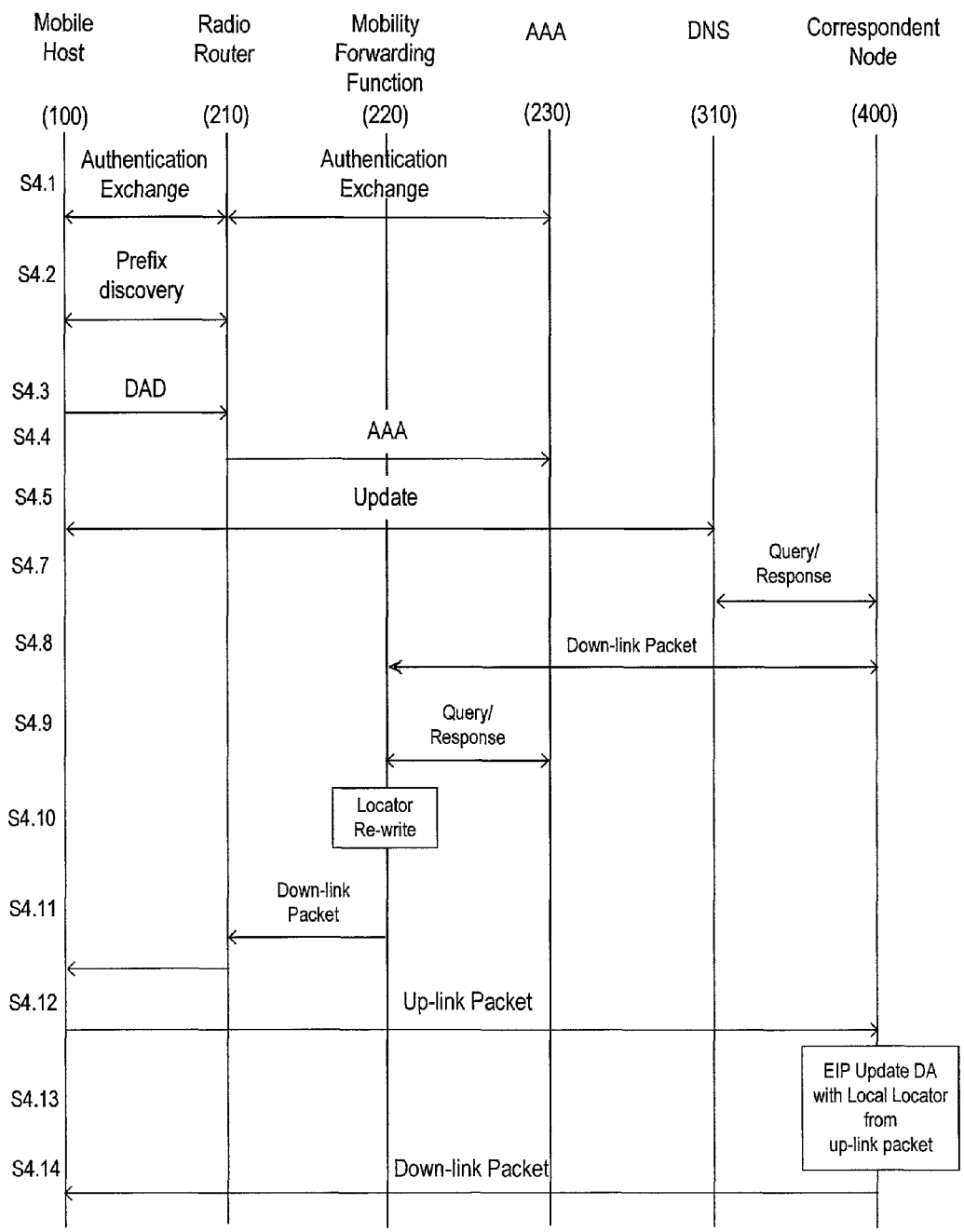
FIG. 4 is a sequence diagram showing an example basic operation of the example multi-homing mobile Internet system, in accordance with one embodiment.

FIG. 4 is a sequence diagram of an example basic operation of the multi-homing based mobile Internet of one embodiment. The basic operation involves the mobile host 100, a first radio router 210, a mobility forwarding function (MFF) 220 of the provider network 200, an [spell out] (AAA) system 230 of the provider network 200, a domain name system (DNS) 310, and the correspondent node 400. The domain name system 310 may be a dynamic domain name system. The MFF may be located in every border router or located in a more centralized location.

The basic operation of the example embodiment may be initiated by an authentication exchange between the mobile host 100 and the provider network 200 (S4.1). The authentication may use extensible authorization protocol (EAP) and an EAP method for authenticating the mobile host 100 prior to access. The mobile host may discover an IP prefix associated with the service provider 200 and the radio router 210 (S4.2) and configure its IPv6 address using the IP prefix. The mobile host 100 may then send a neighbor solicitation message to the radio router 210 of the provider network 200 (S4.3), and perform duplicated address detection (DAD). A successful DAD process may trigger the radio router 210 to send an "accounting start" EID message to the provider's AAA system 230, including the framed IPv6 attribute configured by the mobile host 100 (S4.4).

The mobile host 100 may update the DNS 310 record after authenticating with a radio router (S4.5). The DNS may contain multiple locator values for the mobile host 100.

The correspondent node 400 preparing a down-link packet, a block of data transmitted from a correspondent node to a mobile host, to be routed to the mobile host 100 may query the DNS 310 and recover the global locator of the mobile host 100 (S4.6). The correspondent node 400 may configure the destination address of the down-link packet using the global locator value of the mobile host retrieved from the DNS 310, a proper endpoint identifier type value, and setting the local locator value to all zeros (S4.7).

The Internet 300 backbone may be configured to route on the global locator portion of the IPv6 address. The provider network 200 may route the packet to the destination using the local locator portion of the IPv6 address. The local locator address may be 32 bits or 28 bits if the IPv6 address contains a 4 bit identifier type value. In the example embodiment, a zero local locator value indicates that this packet requires further processing in order to determine the subnet associated with the radio router 210 which had previously authenticated the mobile host 100 which is associated with the endpoint identity value contained in the lower 64 bits of the IPv6 address. This additional processing may be performed by the Mobility Forwarding Function (MFF) 220 of the provider network 200. The MFF 220 may be located in every border router or in a more centralized location.

The MFF 220 may be operable to process any packet received with the local locator value of the IPv6 address set to zero. The MFF 220 may have an interface to the provider's AAA system 230. As part of the previous authentication of the mobile host, the provider's AAA system 230 may contain the latest subnet associated with the radio router entity which authenticated the mobile host 100. The MFF 220 may query the provider's AAA system 230 with the endpoint identifier value recovered from the IPv6 address and the AAA system 230 may return the subnet information (S4.9). If the endpoint identifier is unknown to the AAA queried, the MFF 220 may return a destination unreachable error message. Otherwise, the MFF 220 may overwrite the local locator value with the subnet information received from the AAA system 330 (S4.10). The packet may then be routed across the provider's network 200 towards the radio router 210 to be transmitted to the mobile host 100 (S4.11).

When the mobile host 100 discovers another radio router 211 or 210A, the same process may be repeated to authenticate the mobile host 100 for access with another radio router 211 or 210A.

The mobile host 100 receiving a down-link packet containing location information of the correspondent node 400 may prepare an up-link packet to be directly routed to the correspondent node 400 (S4.12). The correspondent node 400, upon receiving the up-link packet containing the address of the mobile host, may store the local locator of the mobile host 100 discovered from the up-link packet (S4.13) and prepare subsequent down-link packets to be directly routed to the mobile host 100, bypassing the MFF 220 (S4.14).

Enhanced Relocation Procedure

Figure 5:
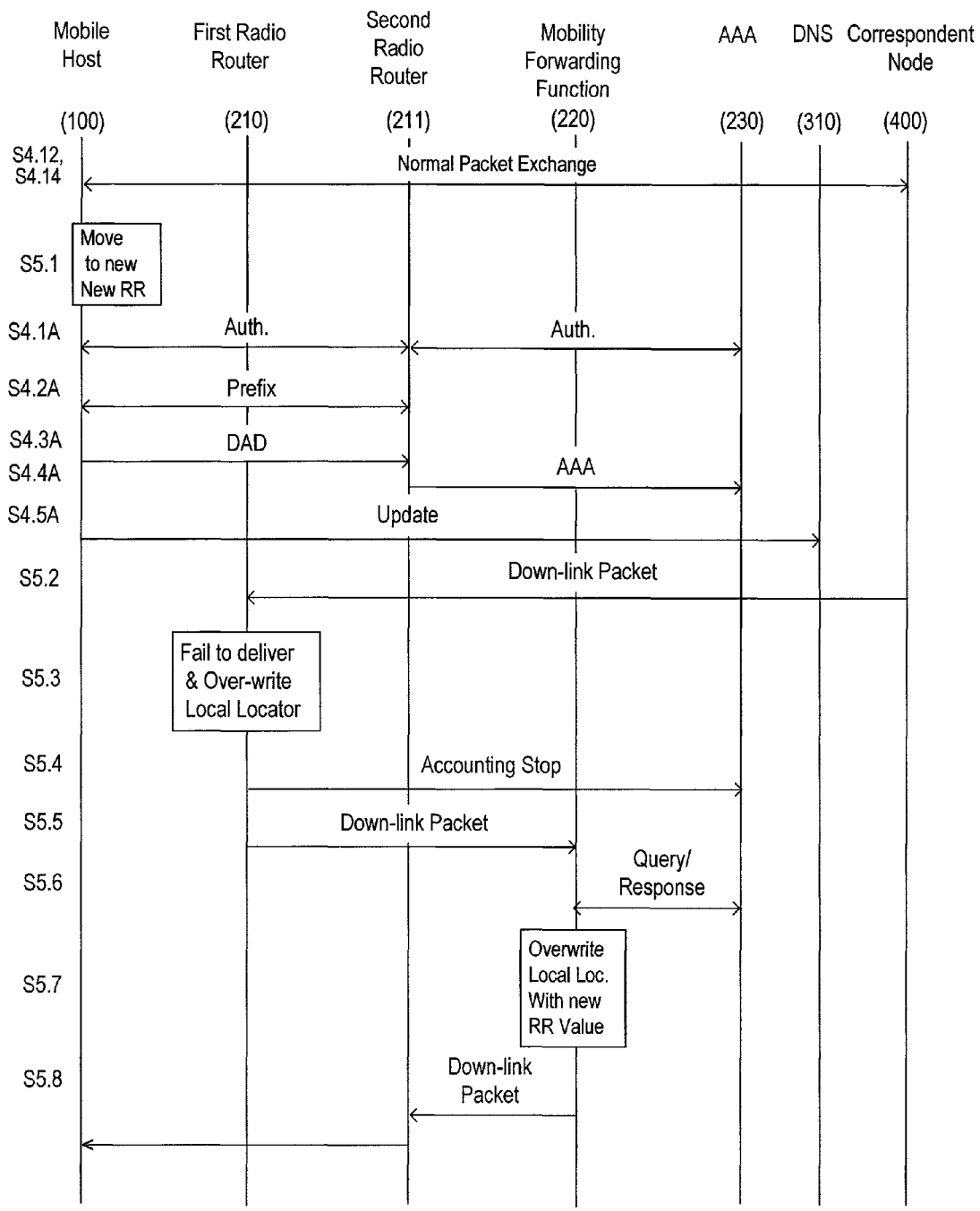
FIG. 5 is a sequence diagram showing an example enhanced relocation procedure of the example multi-homing mobile Internet system, in accordance with one embodiment.

FIG. 5 is a sequence diagram of an example enhanced relocation procedure utilized by one embodiment. The enhance relocation procedure may involve the mobile host 100, the first radio router 210, the second radio router 210A, the MFF 220, the AAA system 230 of the provider network 200, the DNS 310, and the correspondent node 400.

Established normal packet exchange (S4.12, S4.14) may be interrupted when the mobile host moves out of the coverage of the first radio router 210 and in to the coverage of a second radio router 210A (S5.1). The mobile host 100 may exchange authentication with the new radio router 210A and establish connection as described previously (S5.3-7).

When the first radio router 210 receives a packet for the mobile host 100 which is no longer in its coverage (S5.2), the first radio router 210 may rewrite the local locator value of the packet with zero (S5.3), send an "accounting stop" message to the provider's AAA system 230 (S5.4), and route the packet back towards the mobility forwarding function 220 (S5.5). The MFF 220 may query the provider's AAA system 230 to retrieve the latest subnet information associated with the mobile host 100 (S5.6) and overwrite the local locater value of the packet with the information retrieved (S5.7). The packet may then be routed towards the second radio router 210A and transmitted to the mobile host 100 (S5.8).

Signaling Free Mobility and IP Paging

Figure 6:
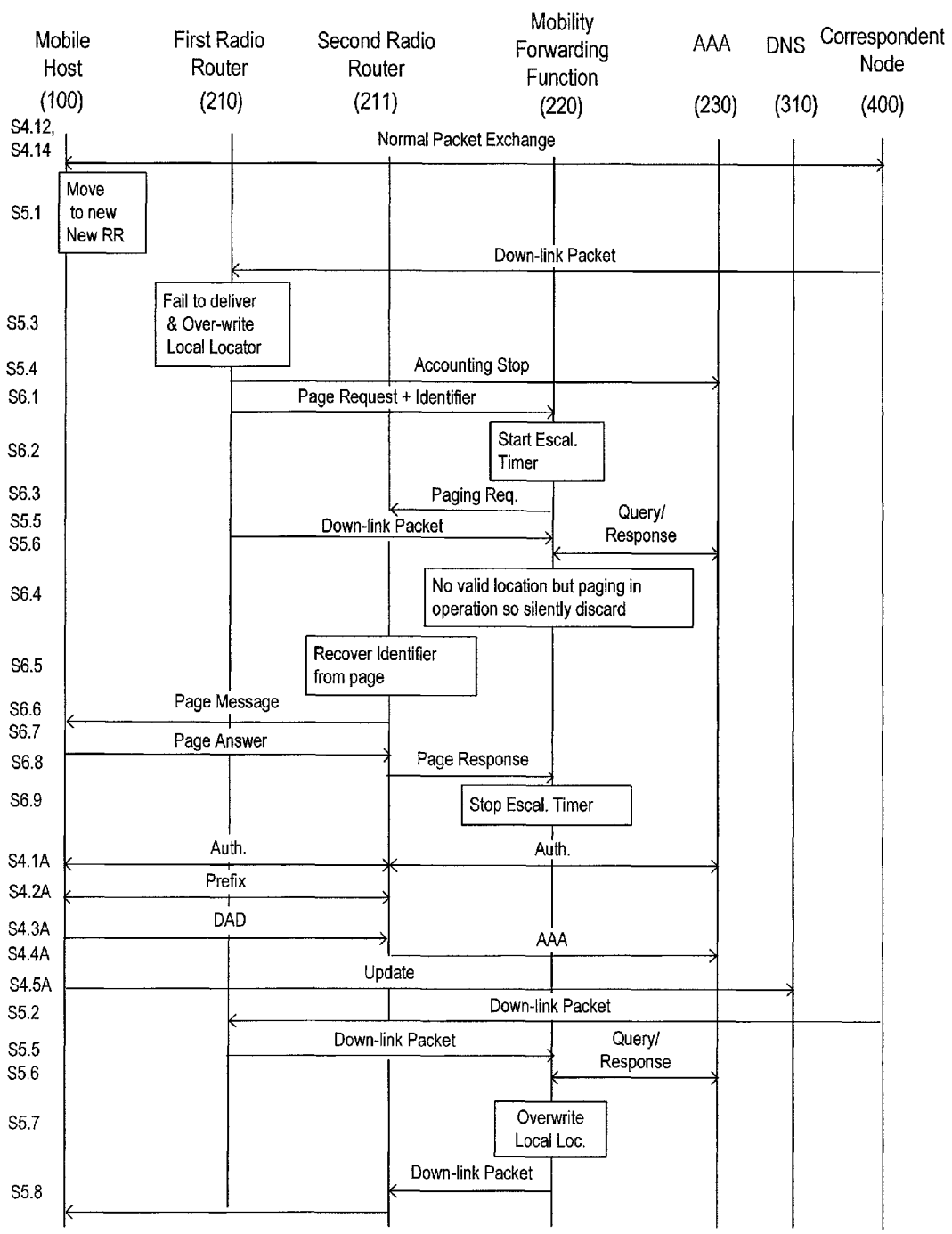
FIG. 6 is a sequence diagram showing an example signaling free mobility IP paging procedure of the example multi-homing mobile Internet system, in accordance with one embodiment.

FIG. 6 is a sequence diagram of an example signaling free mobility IP paging procedure utilized by one embodiment. The signaling free mobility IP paging procedure may involve the mobile host 100, the first radio router 210, the second radio router 210A, the MFF 220, the AAA system of the provider network 230, the DNS 310, and the correspondent node 400.

The IP paging procedure may locate the mobile host 100 which does not automatically signal the provider network 200 when it has moved from the coverage of one radio router 210 into the coverage of another radio router 211 operated by the same provider 200. When normal packet exchange (S4.12, S4.14) is interrupted because the mobile host 100 moves to the coverage of the second radio router 211 (S5.1), the first radio router 210 originally authenticated the mobile host 100 may receive a down-link packet designated for the mobile host 100 no longer within its coverage (S5.2). In addition to overwriting the local locator value of the down-link packet (S5.3) and sending an accounting stop message to the AAA system 300 (S5.4), the first radio router 210 may send a page request containing packet's endpoint identifier value to the MFF 220 of the provider network 200 (S6.1). This request may also include an encapsulated down-link packet. The MFF 220 may start an internal paging escalation timer and send the page request to radio routers associated to the MFF 220 (S6.3). Meanwhile, if the MFF 220 receives down-link packets designated for the mobile host 100 (S.5.5), the MFF 220 may query the AAA 330 for mobile host's subnet information (S5.6). If the AAA contains no valid mobile host 100 location information and paging procedure is still in progress, the MFF 220 may silently discard the down-link packet (S6.4).

Each radio router 210, 211 of the provider network 200 receiving a page request (S6.3) may attempt to page the mobile host 100 (S6.7) using the endpoint identifier contained in the paging request (S6.5). When a radio router 210A receives a page answer from the mobile host 100, it may send a page response to the MFF 220 which may then stop its internal paging escalation timer (S6.10). A successful page may trigger the mobile host 100 to authenticate with the second radio router, establish connection as described previously (S4.1A-4.4A), and update the AAA system 330 record for the mobile host 100 (S4.5A). Any down-link packet subsequently received by the first radio router 210 (S5.2) may be returned back to the MFF (S5.5) which may overwrite the local locator value of the packet (S5.7) with the subnet information on the AAA system 330 (S5.6). The down-link packet may be routed to the second radio router 210A and delivered to the mobile host 100 (S5.8).

If the internal paging escalation timer of the MFF 220 times-out before a paging answer is received, the MFF 220 may return a "destination unreachable" message to the correspondent node 400.

Figure 7:
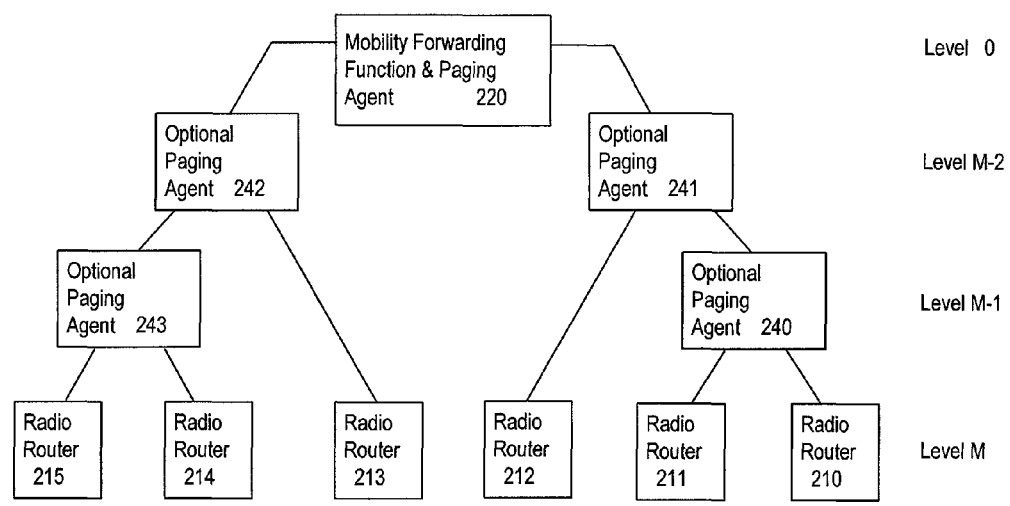
FIG. 7 is a block diagram showing an example hieratical paging structure of the example multi-homing mobile Internet system, in accordance with one embodiment.

FIG. 7 is a block diagram showing an example paging hierarchy utilized by one embodiment. In the paging hierarchy, radio routers 210-215 at level M may have association with paging agents 240, 243 at level M-1, paging agents 240, 243 at level M-1 may have association with paging agents 242, 241 at level M-2. The MFF 220 may be at the highest (lowest number) level.

When the radio router 210 originally authenticated the mobile host 100 fails to delivery a packet to the mobile host 100, instead of overwriting the local locator value and forwarding the packet directly to the MFF 220 (S.6.8), the radio router 210 may send a page request to the paging agent 240 with which it has association. The paging agent 240 may start its own page escalation timer and send the paging request to each of the radio routers 211 or paging agents (not shown) one level lower, with the exception of the agent or router which originated the page request. If the paging agent 240 fails to receive a page answer before its page escalation timer expires, the paging agent 240 may send the page request towards the paging agent 241 with which it has paging association one level higher. The upper level paging agent 241 may perform the same procedure until a page answer is received or until the page request reaches the MFF 220 and the MFF's page escalation timer expires.

Figure 8:
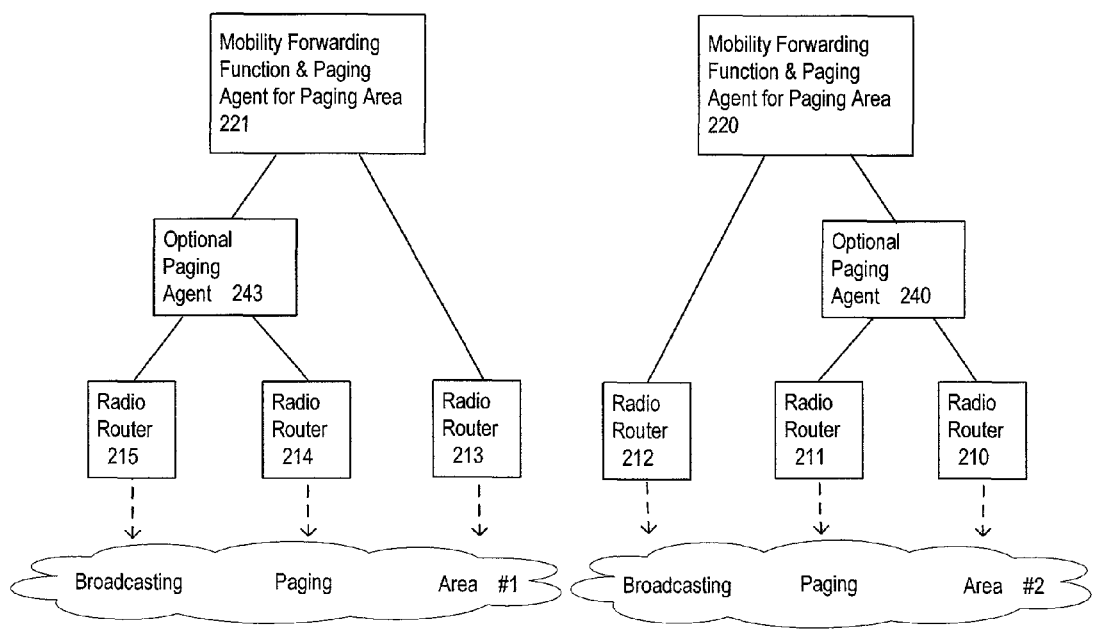
FIG. 8 is a block diagram showing an example hieratical paging structure including paging areas of the example multi-homing mobile Internet system, in accordance with one embodiment.

FIG. 8 is a block diagram of an example paging hierarchy including paging areas utilized by one embodiment. The IP paging procedure may be optimized by dividing radio routers into paging areas (for example, broadcast paging area #1 and broadcast paging area #2) each with its own MFFs 221 and 220, respectively. The mobile host 100 moving from one paging area to another may receive a broadcast and authenticate itself to the network on its own. A network may also enable paging areas to overlap. Radio routers 210-215 may be "multi-homed" to multiple paging agents belonging to different paging areas. When an IP paging request is sent by a radio router 210, it may include in the paging request a paging area identifier associated with the mobile host 100. When the paging area identifier is included in the paging request, only the MFF 220 responsible for a particular paging area may be able to send a destination unreachable message to the correspondent node 400.

Fast Handover Support

Figure 9:
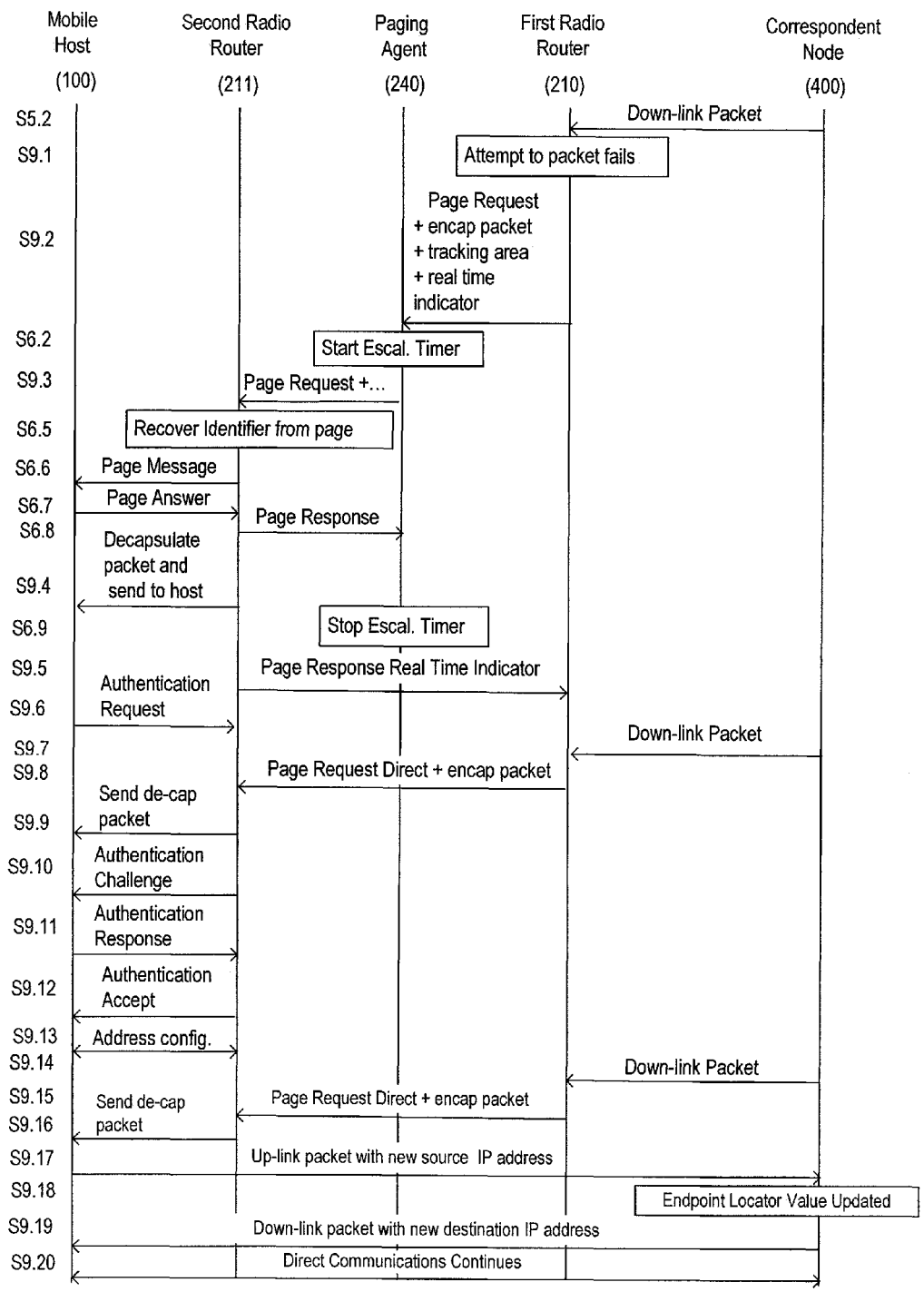
FIG. 9 is a sequence diagram showing an example fast handover support procedure for down-link packets of the example multi-homing mobile Internet system, in accordance with one embodiment.
Figure 10:
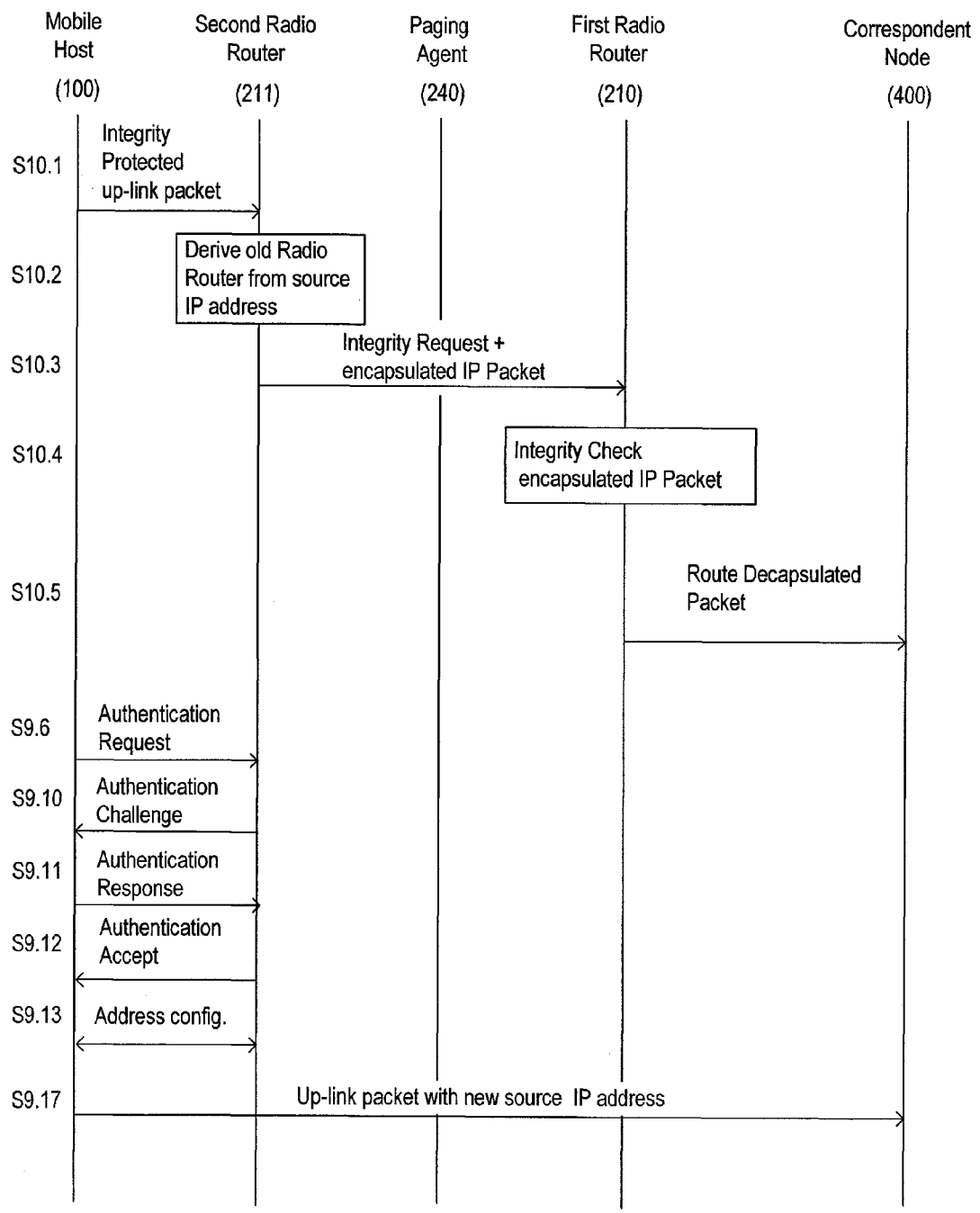
FIG. 10 is a sequence diagram showing an example fast handover support procedure for up-link packets of the example multi-homing mobile Internet system, in accordance with one embodiment.

FIGS. 9 and 10 are sequence diagrams showing example fast handover support procedures for down-link and up-link packets, respectively, utilized by one embodiment. The fast handover support procedures may involve the mobile host 100, the first radio router 210, the second radio router 211, the paging agent 240, and the correspondent node 400. The mobile host 100 may allow applications to indicate priority associated with a particular packet. The first radio router 210 may include functionalities to determine whether a packet is of a real time flow. The determination may be based on the received differentiated services code point (DSCP) values or on the currently active radio bearers used to transport the packet. The paging agent 240 may be the MFF 220.

The fast handover support procedure may establish a temporary tunnel between the first and second radio routers 210, 211 which allow real-time packets to be transmitted to and from the mobile host 100 before the mobile host completes its authentication process with the new radio router 211.

Referring to FIG. 9, when a down-link packet reaches the first radio router 210 (S.5.2) which is unable to deliver the packet (S9.1), the first radio router 210 may send, in addition to a page request, an encapsulated packet including a real time indicator and tracking area information, to a paging agent with which it has association (S9.2). The real time indicator may indicate whether the old radio router 210 has determined the packet to be part of a real time flow. Paging agent 240 may start the page escalation timer when it receives the page request (S6.2) and send the page request to radio routers associated with the paging agent 240 with the encapsulated packet, which may include the real time indicator and tracking area information (S9.3).

A second radio router 211 receiving the page request may recover a mobile host endpoint identifier value from the page (S6.5) and broadcast the page to mobile hosts in its coverage area (S6.6). The mobile host 100 receiving the page request may answer the page (S6.7) thus notifying to the second radio router of its presence. The second radio router 211 may then notify the paging agent 240 that the mobile host 100 has been located (S6.8) and the paging agent 240 may stop its escalation timer (S6.9). Meanwhile, the second radio router 211 may decapsulate the packet received with the page request and send the packet to the mobile host 100 (S9.4). The second radio router 211 may further contact the first radio router 210 with a page response and the real time indicator (S.9.5).

During the time that the mobile host authenticates with the second radio router (S9.6, 9.9-13), packets which arrive at the first radio router designated for the mobile host 100 (S9.7, S9.14) may be encapsulated and routed directly to the second radio router 211 (S9.8, S9.15) to be decapsulated and transmitted to the mobile host 100 (S9.9, 9.16). When the mobile host 100 completes authentication with the new radio router 211, the mobile host 100 and the correspondent node 400 may exchange IP address (S9.17-19) and resume normal communication (S9.20).

Referring to FIG. 10, the fast handover support procedure for an up-link packet allows mobile hosts 100 to send packets before authentication is complete with the second radio router 211. To send a packet before authentication (S9.6, 10-13, and 17), the mobile host may integrity protect the up-link packet being sent into network (S100.1), the integrity protection is in addition to any link layer ciphering mechanisms. The second radio router 211 receiving an integrity protected packet from the unauthenticated mobile host 100 may derive the first radio router's 210 IP address from the source address of the packet. The second radio router 211 may forward the encapsulated IP packet along with an integrity request to the first radio router 210. The first radio router 210, having previously authenticated the mobile host 100, may perform integrity check on the encapsulated up-link packet (S10.4) and decapsulate the up-link packet prior to routing the packet to the correspondent node 400 (S10.5).

Intra-Provider Policy Relocation

Figure 11:
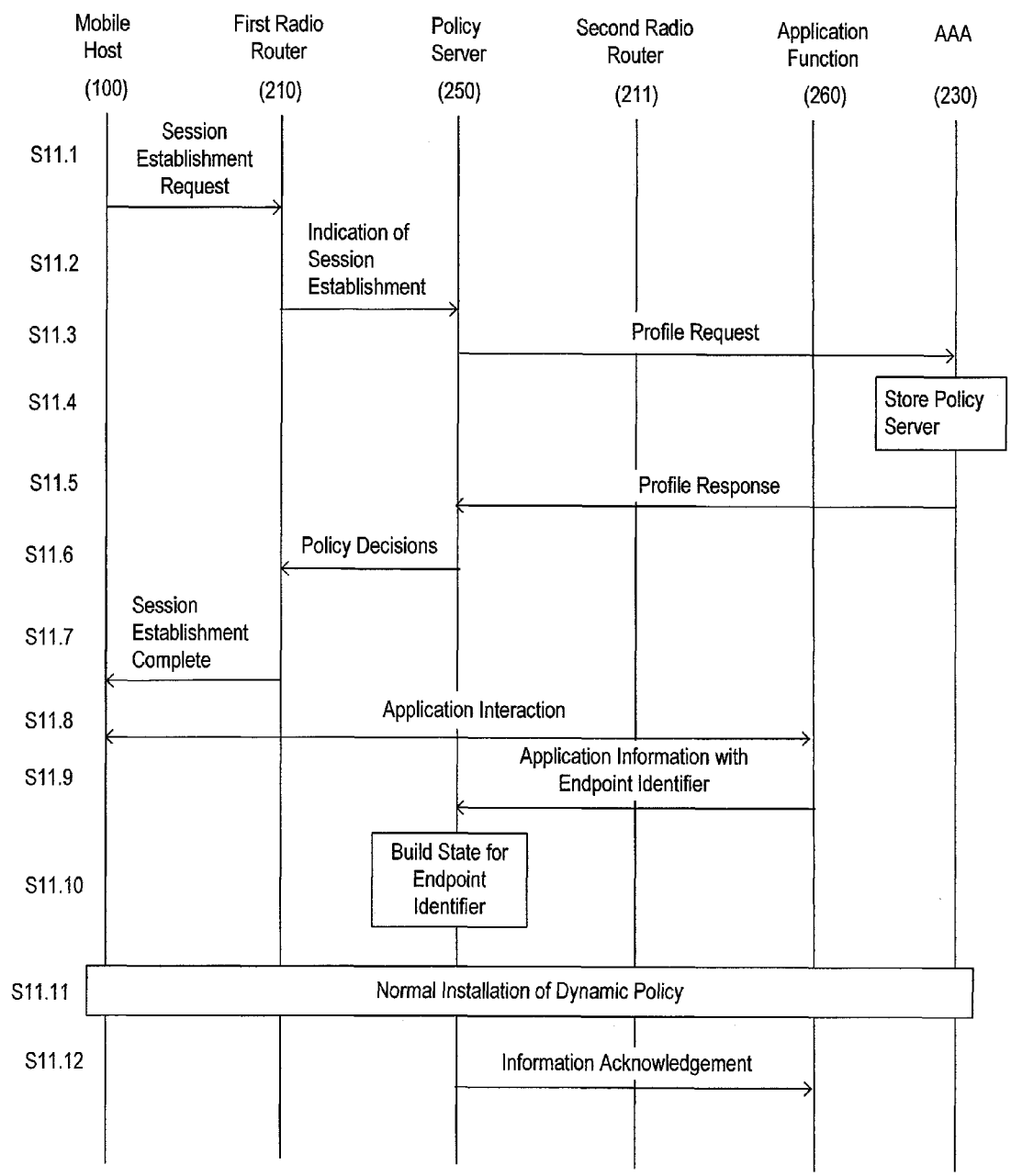
FIG. 11 is a sequence diagram showing an example policy enforcement initialization procedure of the example multi-homing mobile Internet system, in accordance with one embodiment.
Figure 12:
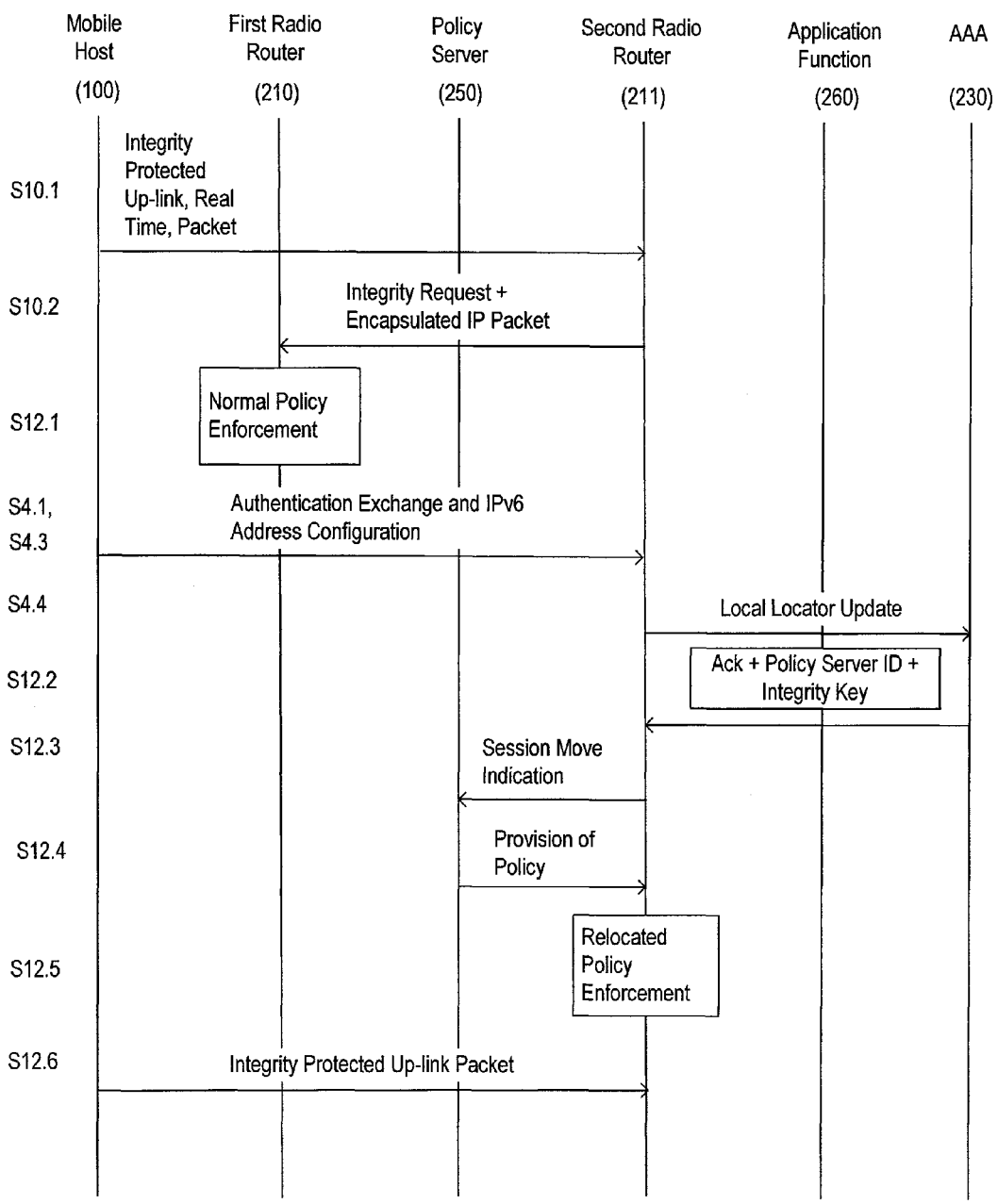
FIG. 12 is a sequence diagram showing an example policy intra-provider policy relocation procedure of the example multi-homing mobile Internet system, in accordance with one embodiment.

FIGS. 11 and 12 are sequence diagrams showing an example initialization of policy enforcement and an example intra-provider policy relocation procedure utilized by one embodiment. The intra-provider policy relocation procedure may involve the mobile host 100, the first radio router, a policy server 250 of the provider network 200, the second radio router 211, an application function 260 of the provider network 200, and the AAA system 230 of the provider network 200. The application function 260 may be a proxy.

The policy enforcement and relocation procedure enables the provider networks to apply policy to the IP flows to/from authenticated mobile hosts. Policy may include applying rate limiting to certain flows, applying additional security measures to protect the subscriber from various attacks, providing regulatory data retention capabilities, providing law enforcement requested intercept functionality. In conventional mobile networks, these functions are typically located at the centralized tunnel endpoint. Since this embodiment does not utilize centralized entity via which all user flows traverse, the policy enforcement will instead be distributed to the radio routers.

Referring to FIG. 11, when the mobile host 100 requests session establishment with the radio router 210 (S11.1), the radio router 210 may notify the policy server 250 of the session establishment (S11.2). The policy server may then send a profile request to the provider's AAA system 230 (S11.3). The AAA system 300 may store the policy server 250 location it extracts from the profile request (S1.4) and respond to the profile request (S11.5). The policy server 250 may make a policy decision based on the profile retrieved from the AAA system 230 and forward the policy decision to the radio router 210 (S11.6). Upon receiving a positive decision, the radio router 210 may complete session establishment with the mobile host 100 (S11.7) allowing the mobile host 100 to interact with the application function 260 (S11.8). The application function 260 may then forward the application information along with the mobile host 100's endpoint identifier to the policy server (S11.9). The policy server 250 may build a state for the endpoint identifier received (S11.10) and begin a normal installation of dynamic policy (S11.11). The policy server may 250 also send an acknowledgement of received information to the application function 260 (S11.12).

Referring to FIG. 12, as described in the previous section detailing the fast handover support for up-link packets, integrity protected packets may be transmitted through a radio router 211 with which the mobile host 100 has not authenticated with (S10.1). The second radio router 211 may forward such packet to the first radio router 210 previously authenticated the mobile host 100 (S10.2). The first radio router 210 may enforce established policy on such packets (S12.1). When the mobile host 100 authenticates with the second radio router 211 (S4.1-3) and updates its local locator information on the AAA system 230 (S4.4), the AAA system 230 may send the second radio router 211 an update acknowledgment containing the policy server's 250 information and an integrity key (S12.2). The new radio router 211 may use the policy server's information to indicate to the policy server 250 that the mobile host 100 has moved into its coverage (S12.3). The policy server 250 may provide the policy to the second radio router (S12.4) and policy enforcement may subsequently be performed at the second radio router 211 (S12.5-6).

Inter-Provider Policy Relocation

Figure 13:
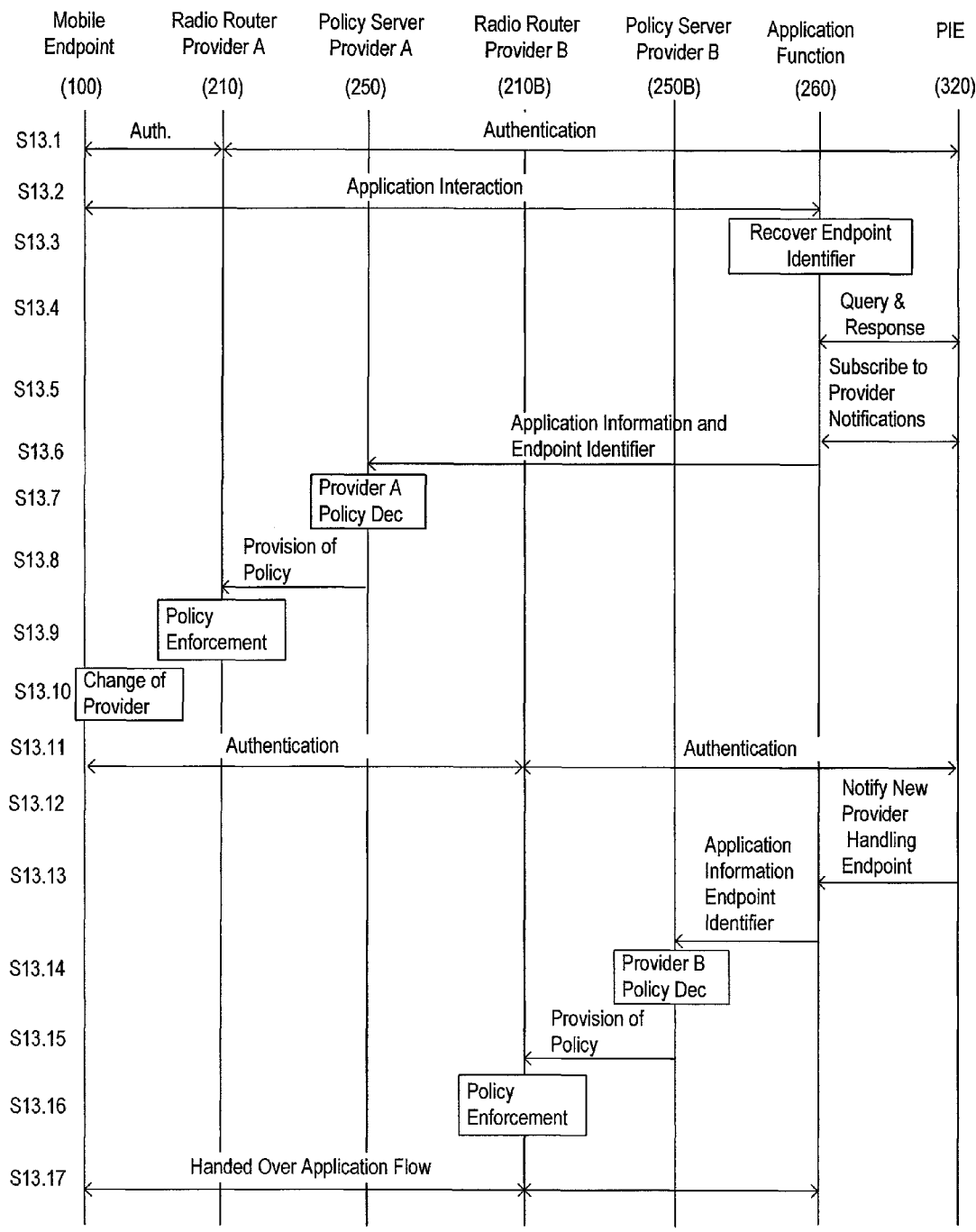
FIG. 13 is a sequence diagram showing an example policy inter-provider policy relocation procedure of the example multi-homing mobile Internet system, in accordance with one embodiment.

FIG. 13 is sequence diagram of an example inter-provider policy relocation procedure which may be utilized by one embodiment. The inter-provider policy relocation procedure may involve the mobile host 100, the radio router 210 of the first provider network 200, the policy server 250 of the first provider network 200, a radio router 210B of a second provider 200B, a policy server 250B of the second provider network 200B, the application function 260, and a provider indicating entity (PIE) 320.

In the inter-provider policy relocation procedure, when the mobile host 100 authenticates with a radio router 210 of the first provider 200, the authentication information may be forwarded to the PIE 320 (S13.1). The application function 260 may recover the endpoint identifier of the mobile host 100 through interacting with the mobile host 100 (S13.2-3). The application function 260 may use the endpoint identifier to query the PIE 320 (S13.4) and subscribe to be notified by the PIE 320 if the mobile host 100 changes or adds a provider (S13.5). The application function 260 may also provide application information and the endpoint identifier value to the first provider's policy server 250 (S13.6) which may enable the radio router 210 of the first provider to enforce the relevant policy (S13.7-9). When the mobile host 100 authenticates with the second provider 200B (S13.10, 13.11) and updates its information on the PIE 320, the PIE 320 may automatically notify the application function 260 by providing information on the second provider 200B handling the mobile host 100 (S13.12). The application function 260 may then forward the application information and the endpoint identifier of the mobile host 100 to the policy server 250B of the second provider 200B which may trigger policy enforcement on the radio router 210B of the second provider network 200B (S13.14-13.16). The application flow may then travel between the mobile host 100 and the application function 260 through the radio router 210B of the second provider network 200B (S13.17).

Mobile routers 210, 211, 210B, and 211B, which enforces policies, may maintain records of each mobile host 100 usage of the associated provider networks 200, 200B to enable providers 200, 200A to charge the mobile host 100 for fragments of usage.

Inter-Provider Fast Handover Support

Figure 14:
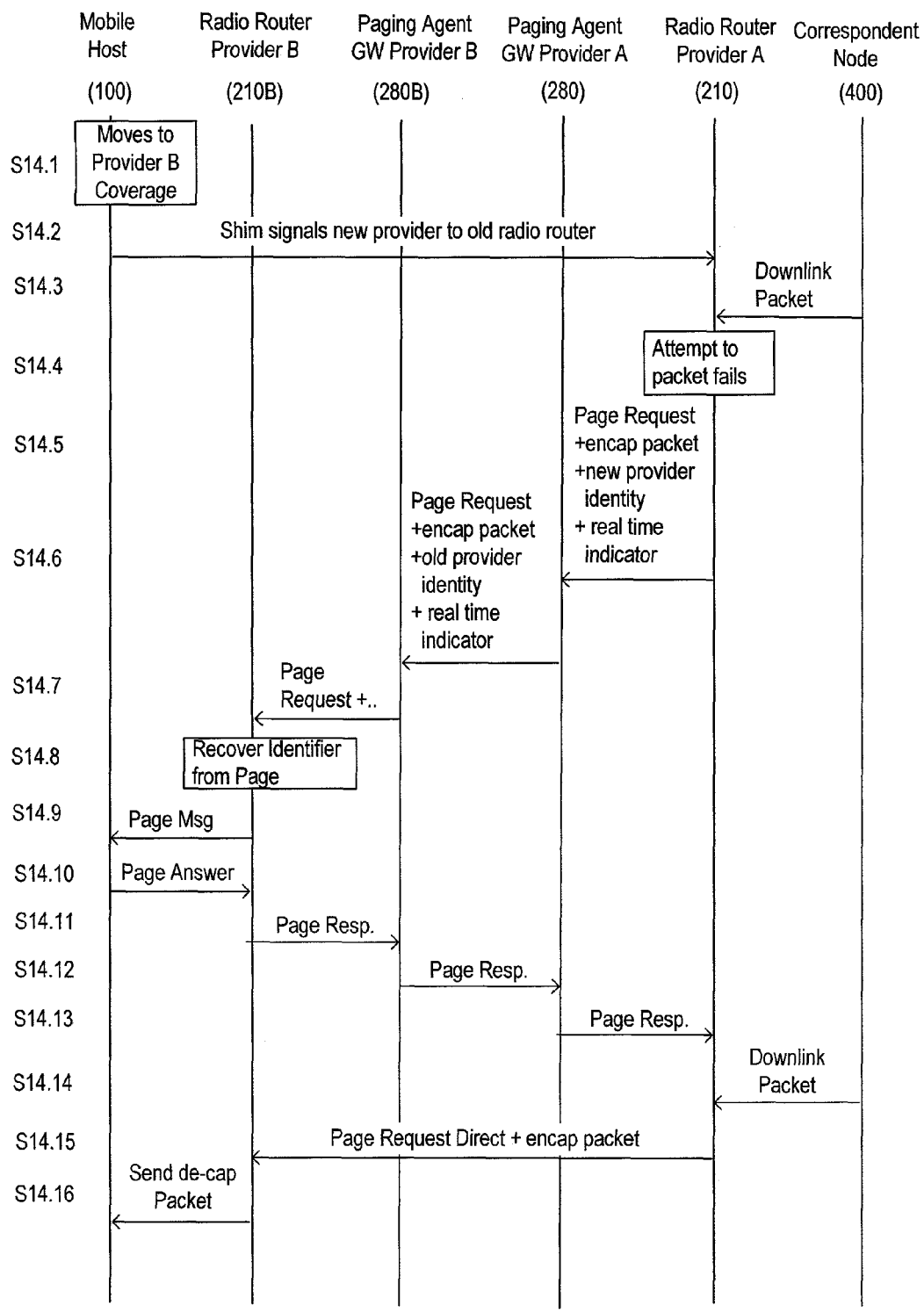
FIG. 14 is a sequence diagram showing an example policy inter-provider fast handover support procedure of the example multi-homing mobile Internet system, in accordance with one embodiment.

FIG. 14 is a sequence diagram showing an example inter-provider fast handover support procedure utilized by one embodiment. The inter-provider fast handover support procedure may involve the mobile host 100, the radio router 210 of the first provider network 200, a paging agent gateway 280 of the first provider network 200, the radio router 210B of the second provider network 200B, a paging agent gateway 280B of the second provider network 200B, and the correspondent node 400. The EIP utilized by inter-provider fast handover support procedure is a shim in the normal TCP/IP stack. When the mobile host 100 moves to a second provider's coverage (S14.1), the EIP/shim may signal to the radio router 210 in the first provider's network 200, and provide the radio router 210 with the identify of the new provider 200B (S14.2) to enable a page to be sent to the new provider 200B. The endpoint identifier of this signal may be zero, which would cause the packet to be routed to the MFF 220 with a user datagram protocol (UDP) packet containing the actual endpoint identifier to allow the MFF to overwrite locator values of the packet.

When a down-link packet arrives at the radio router 210 of the first provider network (S14.3) and the delivery attempts fail (S14.4), the radio router 210 may send a page request including the encapsulated packet, the new provider identity retrieved from the signal, and a real time indicator to the paging agent gateway 280 of the first provider network 200 (S14.5). The paging agent gate way 280 of the first provider network 200 may send the page request including the encapsulated packet, the first provider's identity, and the real time indicator to the paging agent gateway 280B of the second provider network 200B using the second provider identity provided by the radio router 210 (S14.6). The same information may be used to page radio routers in the second provider network (S14.7). The radio router 210B of the second provider network 200B may recover the endpoint identifier value from the page and page the mobile host 100 (S14.9). When the mobile host 100 answers the page (S14.10), the page response form the mobile host 100 may be forwarded through the radio router 210B of the second provider network 200B, the paging agent gateways of both provider networks 280, 280B, to reach the radio router 210 of first provider network 200 that originally authenticated the mobile host 100. The radio router 210 of the first provider network 200 may recover the new locator values of the mobile host 100 from the page response. Down-link packets that arrive at the radio router 210 of the first provider network 200 may subsequently be encapsulated and directly routed to the radio router 210B of the second provider network 200B. The radio router 210B of the second provider network 200B may decapsulate the packet and transmit it to the mobile host (S14.16).

It should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method, comprising:
receiving a down-link packet having an endpoint identity protocol element (EIP), the EIP comprising a global locator associated with a provider network, a first local locator set to a predetermined value, and an endpoint identifier associated with a mobile host;
querying the provider network to obtain a second local locator value associated with the mobile host, the second local locator value indicates the location of a first radio router with which the mobile host had previously exchange authentication;
overwriting the first local locator of the EIP with the second local locator; and
routing the down-link packet towards the mobile host using the second local locator.

2. The method of claim 1, further comprising:
receiving a page request from the first radio router, the page request containing the endpoint identifier;
sending the page request to a first plurality of paging agents or a plurality of radio routers; and
receiving a page answer from a paging agent or a second radio router if the mobile host is located, wherein the mobile host updates the local locator value on the provider network.

3. The method of claim 2, further comprising:
starting an escalation timer; and
sending a destination unreachable message to a correspondent node if no page answer is received when the escalation timer expires.

4. The method of claim 2, wherein a paging agent further forwards the page request to a second plurality of paging agents arranged in a multi-level hierarchy, each paging agent having an independent escalation timer.

5. The method of claim 2, further comprising discarding down-link packets received before receiving the page answer.

6. The method of claim 2, further comprising:
starting an escalation timer;
querying the database when the escalation timer expires;
receiving a plurality of other network providers that have authorized the mobile host for access, including a second provider network,
forwarding the page request to a paging gateway of the second provider network; and
receiving the page answer through the paging gateway if the mobile host is located.

7. The method of claim 1, wherein the EIP further comprises an endpoint identifier type data.

8. An apparatus, comprising:
- an down-link packet register for receiving and storing a down-link packet having a endpoint identity protocol element (EIP), the EIP comprising a global locator associated with a provider network, a first local locator set to a predetermined value, and an endpoint identifier associated with a mobile host;
- an local locator register for storing a second local locator value associated with the mobile host obtained by querying the provider network, the second local locator indicates the location of a first radio router with which the mobile host had previously exchange authentication;
- an processing unit for overwriting the first local locator portion of the EIP with the second local locator; and
- an down-stream port for sending the down-link packet towards the mobile host using the second local locator.

9. The apparatus of claim 8, further comprising: an up-stream output port for transmitting an error message when the local locator register is unable to retrieve the second local locator value.

10. The apparatus of claim 8, further comprising: a paging unit for sending a page message containing the endpoint identifier associated with the mobile host to a plurality of paging agents when the paging unit receives a page request from a paging agent.

11. The apparatus of claim 10, wherein the paging unit forwards the page request to another provider network when the plurality of paging agents do not provide a positive response to the page message within a pre-set time.

12. The apparatus of claim 10, wherein the local locator registers stores a third local locator value received in a positive response to the page message and updates the second local locator value stored on the provider network with the third local locator value.

13. The apparatus of claim 8, wherein the down-link packet originates form a down-stream router which rewrites the first local locator value to the predetermined value when the mobile host cannot be located.

* * * * *